United States Patent
Miceli et al.

(10) Patent No.: US 7,054,496 B2
(45) Date of Patent: May 30, 2006

(54) METHOD AND APPARATUS FOR DISPLAYING ARBITRARILY MAGNIFIED HIGH RESOLUTION IMAGES USING COMPRESSED DOMAIN PROCESSING

(75) Inventors: Sean Miceli, Sunnyvale, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 566 days.

(21) Appl. No.: 10/185,462

(22) Filed: Jun. 27, 2002

(65) Prior Publication Data

US 2004/0001636 A1   Jan. 1, 2004

(51) Int. Cl.
G06K 9/36 (2006.01)
(52) U.S. Cl. .................. 382/235; 382/282
(58) Field of Classification Search ........... 382/232, 382/233, 235, 282, 298, 299; 358/1.2, 1.15, 358/426.04, 451
See application file for complete search history.

(56) References Cited

U.S. PATENT DOCUMENTS

| | | | |
|---|---|---|---|
| 5,845,015 A | 12/1998 | Martucci | 382/250 |
| 5,867,598 A | 2/1999 | de Queiroz | 382/235 |
| 5,867,612 A | 2/1999 | Robson | 382/298 |
| 5,872,874 A | 2/1999 | Natarajan | 382/298 |
| 6,041,143 A | 3/2000 | Chui et al. | 382/232 |
| 6,298,166 B1 | 10/2001 | Ratnakar et al. | 382/248 |

FOREIGN PATENT DOCUMENTS

EP          0 933 694        8/1999

OTHER PUBLICATIONS

Manipulation and Compositing of MC-DCT Compressed Video, IEEE Journal On Selected Areas In Communications, vol. 13, No. 1 Jan. 1995.
Algorithms for Manipulating Compressed Images, Brian C. Smith and Lawrence A. Rowe, University of California at Berkeley, Sep. 1993.

*Primary Examiner*—Duy M. Dang

(57) ABSTRACT

A method for efficiently processing image data for display on a computer monitor is provided. The method initiates with reading image data in a compressed format into a memory associated with the computer. Then, at least one scaled copy of the image data is generated in the compressed format. Next, a display scale is determined for an image to be presented on a computer monitor. If the magnification is less than 100% of an image scale associated with the image data, then, either the image data or the at least one scaled copy of the image data is determined as being closest in magnification to the display scale, without being less than the display scale, to provide a closest in magnification image data. Next, the closest in magnification image data in the compressed format is processed. Then, the processed image data is displayed. The method is capable of displaying a portion of the image at any magnification. An integrated circuit chip and a system for efficiently processing image data for display are also provided.

29 Claims, 10 Drawing Sheets

METHOD AND APPARATUS FOR DISPLAYING ARBITRARILY MAGNIFIED HIGH RESOLUTION IMAGES USING COMPRESSED DOMAIN PROCESSING

BACKGROUND OF THE INVENTION

1. Field of the Invention

This invention relates generally to image display systems and more particularly to a method and apparatus for displaying and manipulating the images in the compressed domain to reduce memory and disk capacity requirements.

2. Description of the Related Art

Advances in the capability of printers, scanners, monitors, digital cameras, etc. are driving a need to display large images, i.e., images greater than about 30 megabytes (MB) in size. The advances combined with increases in resolution and bit depth have sparked a need to display large images. In addition, users that photograph panoramic views from a digital camera or simply stitch together multiple pictures to make a larger picture require the capability to efficiently process the large images being created. Consequently, the demand for storage space on a personal computer for displaying the image causes the display to be painstakingly slow, and in some instances the image may be too large to be displayed.

Furthermore, a user will want to manipulate the image. For example, a user may select, or pan to, different areas of the image as well as changing the magnification of the image. FIG. 1 is a simplified pictorial representation of a large high resolution image stored on a hard disk of a personal computer for display. Image 100 is stored on hard disk 102. A user may select portion 104 of image 100 to be displayed on personal computer monitor 106. Thus, portion 104 must be cropped from image 100 and scaled to fit in the display area of monitor 106.

FIG. 2 is a flowchart diagram of the method operations performed when displaying a large high resolution image on a display. The method is divided into three sections: preprocessing 110, display processing 114 and post processing 122. Preprocessing 110 includes the method operations performed to get the image ready for display processing section 114. Display processing section 114 includes the method operations performed to display an image region at various magnifications. Post processing section 122 includes method operations for restoring the system to the state prior to the preprocessing 110.

The method of FIG. 2 initiates with operation 112 where the image file is read from the disk and decompressed into memory. The method then proceeds to display processing section 114 where the image is cropped 116 to the region that will be displayed. Then, the cropped image is scaled 118 to fit the display area and then displayed 120. The method then advances to operation 124 where the memory holding the image is freed. While this approach is sufficient for images that fit in physical memory of the computer, for images that do not, there is typically too much virtual memory swapping. The virtual memory swapping significantly slows system performance. Another shortcoming of this approach is that a system not supporting virtual memory will not be able to display the image. In addition, as the size of the image to be displayed increases, the scaling algorithm becomes much too computationally expensive and will slow system performance in addition to possibly not being able to fit in the memory.

As a result, there is a need to solve the problems of the prior art to provide a method and apparatus for displaying large high resolution images in an efficient manner where a user can easily change the magnification of a region of the image to be displayed while conserving memory.

SUMMARY OF THE INVENTION

Broadly speaking, the present invention fills these needs by providing a method and system for efficiently processing image data and to enable a user maximum functionality while minimizing the demand on system resources. It should be appreciated that the present invention can be implemented in numerous ways, including as a process, a system, or a device. Several inventive embodiments of the present invention are described below.

In one embodiment, a method for efficiently processing image data for display on a computer monitor is provided. The method initiates with accessing image data stored in a compressed format. The image data is decompressed into a full scale image stored in a memory associated with a computer. Next, at least one pre-scaled image of the full scale image is generated. The at least one pre-scaled image has a magnification less than the full scale image. Then, a display scale of the image for presentation on a computer display is determined. Next, one of the full scale image and the at least one pre-scaled image that is closest in magnification to the display scale without being less than the display scale is selected. Then, the selected image being closest in magnification to the display scale is processed. Next, the processed image is displayed.

In another embodiment, a method for efficiently editing an image on a computer display is provided. The image on the computer display is associated with a plurality of stored images, where each of the plurality of stored images has a different scale size. The method initiates with selecting a portion of an image. Then, an offset of the selected portion of the image is determined. Next, a closest in magnification image from the plurality of stored images is identified. The closest in magnification image has a scale size greater than or equal to a scale size of the selected portion of the image. Then, the image data of the closest in magnification image corresponding to the selected portion of the image is identified. Next, the identified image data is displayed.

In yet another embodiment, a method for reducing memory usage to display an image on a computer display is provided. The method initiates with reading image data in a compressed format into a memory associated with the computer. Then, at least one scaled copy of the image data is generated in the compressed format. Next, a display scale is determined for an image to be presented on a computer monitor. If the magnification is less than 100% of an image scale associated with the image data, then either the image data or the at least one scaled copy of the image data is determined as being closest in magnification to the display scale, without being less than the display scale, to provide a closest in magnification image data. Next, the closest in magnification image data in the compressed format is processed. Then the processed image data is displayed.

In still yet another embodiment, a computer readable media having program instructions for efficiently processing data for display on a computer monitor is provided. The computer readable media includes program instructions for reading image data in a compressed format into a memory associated with the computer. Program instructions for generating at least one scaled copy of the image data in the compressed format are included. Program instructions for determining a display scale of an image to be presented on a computer monitor are included. Program instructions for determining which one of the image data and the at least one scaled copy of the image data is closest in magnification to the display scale without being less than the display scale to provide a closest in magnification image data are included. Program instructions for processing the closest in magnification image data in the compressed format and program instructions for displaying the processed image are also included.

In another embodiment, an integrated circuit chip configured to efficiently process image data in a compressed format for display on a computer monitor is provided. The integrated circuit chip includes display processing circuitry configured to generate at least one scaled image file in a compressed format from a stored image file in the compressed format, the display processing circuitry is capable of identifying one of the stored image file and the at least one scaled image file that is closest in magnification to a display scale of a computer monitor without being less than the display scale, wherein the display processing circuitry is configured to enable cropping and scaling the identified image file in the compressed format.

In yet another embodiment, a computer system for displaying images using compressed domain processing is provided. The computer system includes a storage media storing an image data file in a compressed format. A memory and a monitor for displaying image data are included. The monitor is associated with a display scale for presenting images. A central processing unit (CPU) configured to process instructions directing the stored image data to the memory is included. Display processing circuitry configured to generate at least one scaled image file in a compressed format from a stored image file in the compressed format is included. The display processing circuitry is capable of identifying one of the stored image file and the at least one scaled image file that is closest in magnification to the display scale without being less than the display scale. The display processing circuitry is further configured to enable cropping and scaling the identified image file in the compressed format.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
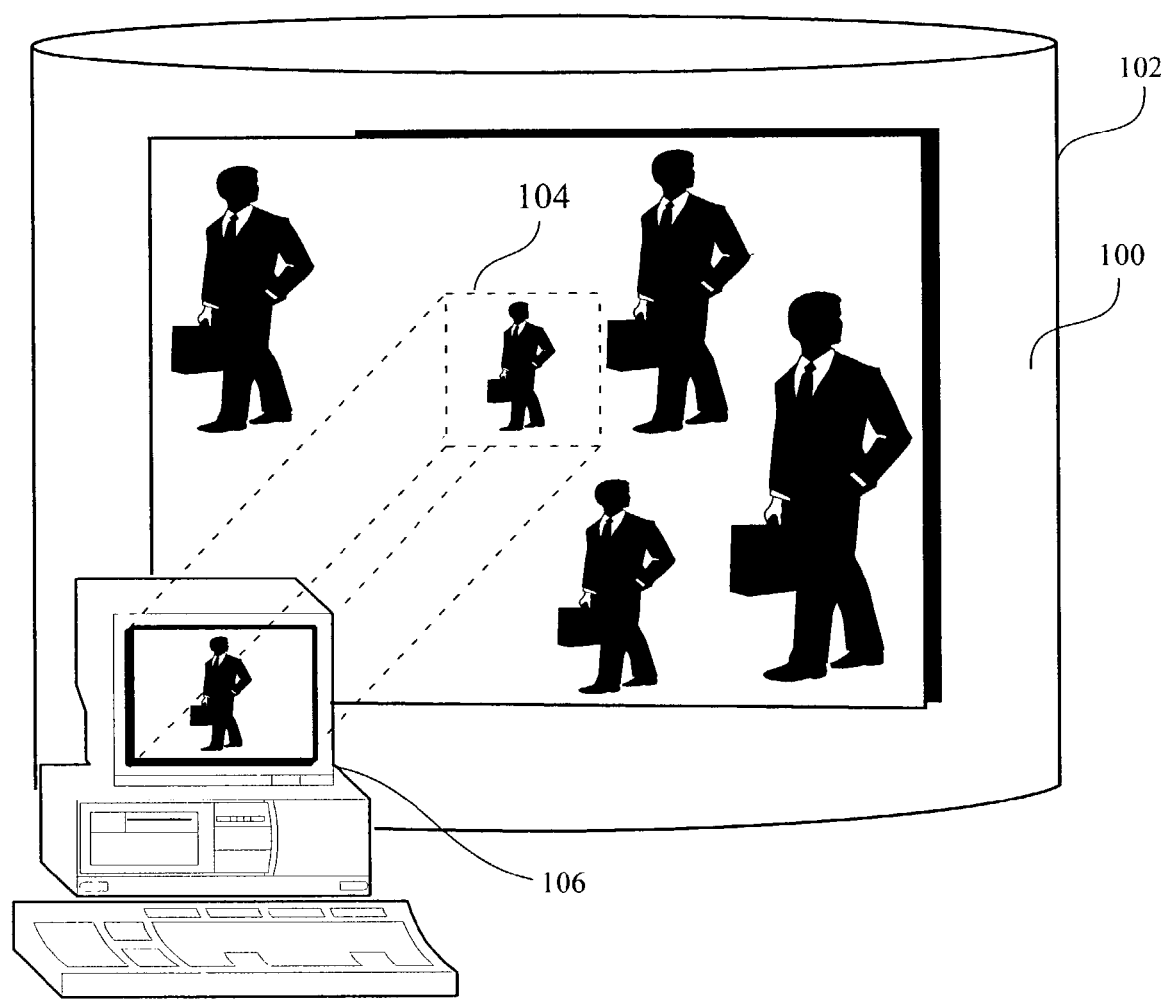
FIG. 1 is a simplified pictorial representation of a large high resolution image stored on a hard disk of a personal computer for display.
Figure 2:
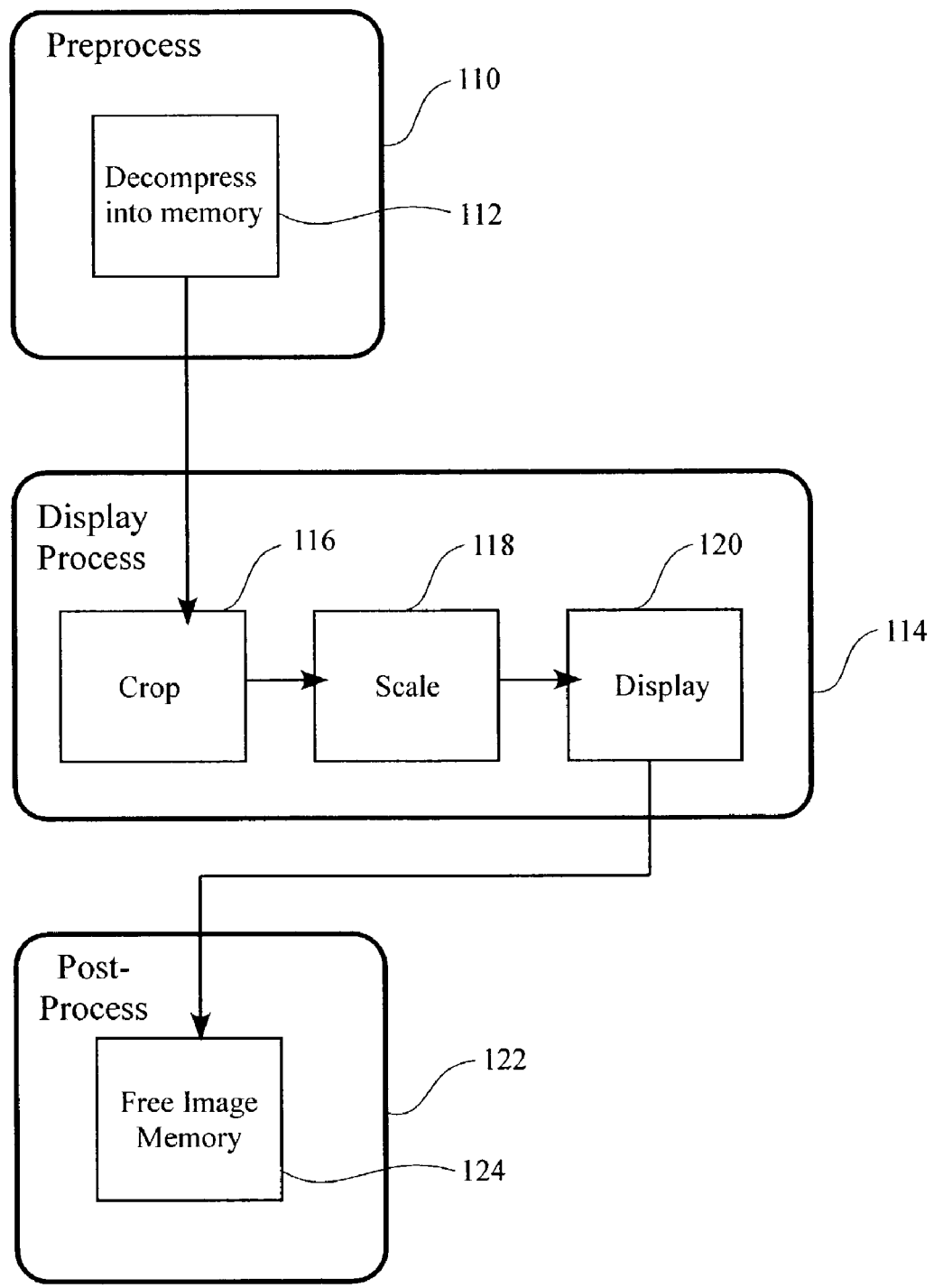
FIG. 2 is a flowchart diagram of the method operations performed when displaying a large high resolution image on a display.

An invention is described for an apparatus and method for reducing the demands on memory and disk space for displaying high resolution images. It will be obvious, however, to one skilled in the art, that the present invention may be practiced without some or all of these specific details. In other instances, well known process operations have not been described in detail in order not to unnecessarily obscure the present invention. FIGS. 1 and 2 are described in the "Background of the Invention" section.

The embodiments of the present invention provide a method and apparatus for allowing a large high resolution image to be efficiently displayed on a small low resolution display. As used herein, a large image refers to an image that is greater than about 30 megabytes (MB) in a decompressed format. The embodiments described below include methods defining three distinct processing sections, i.e., preprocessing, display processing, and post processing. The display processing section includes the steps to be performed to display an image region at various magnifications, i.e., 100% scale, 75% scale, etc. Display processing operations can occur on an image in a compressed format or an image in a decompressed format. Preprocessing includes the steps needed to get to the display processing section. For example, preprocessing includes creating scaled images in either a compressed format or a decompressed format as will be explained in more detail below. Post processing includes any needed steps that need to be performed to restore the system to an equivalent state prior to the preprocessing being performed.

With respect to the embodiments described below, an example of a 150 megabyte image is referred to on more than one instance for illustrative purposes. One skilled in the art will appreciate that the 150 MB image can be generated from taking several pictures with a digital camera and stitching them together to form one panoramic image. Comparatively speaking, a 150 MB image is approximately the same size as a 5×7 inch photograph scanned in at 1200 dots per inch (dpi). The above mentioned example is discussed for illustrative purposes only and is not meant to be limiting in any way.

Figure 3:
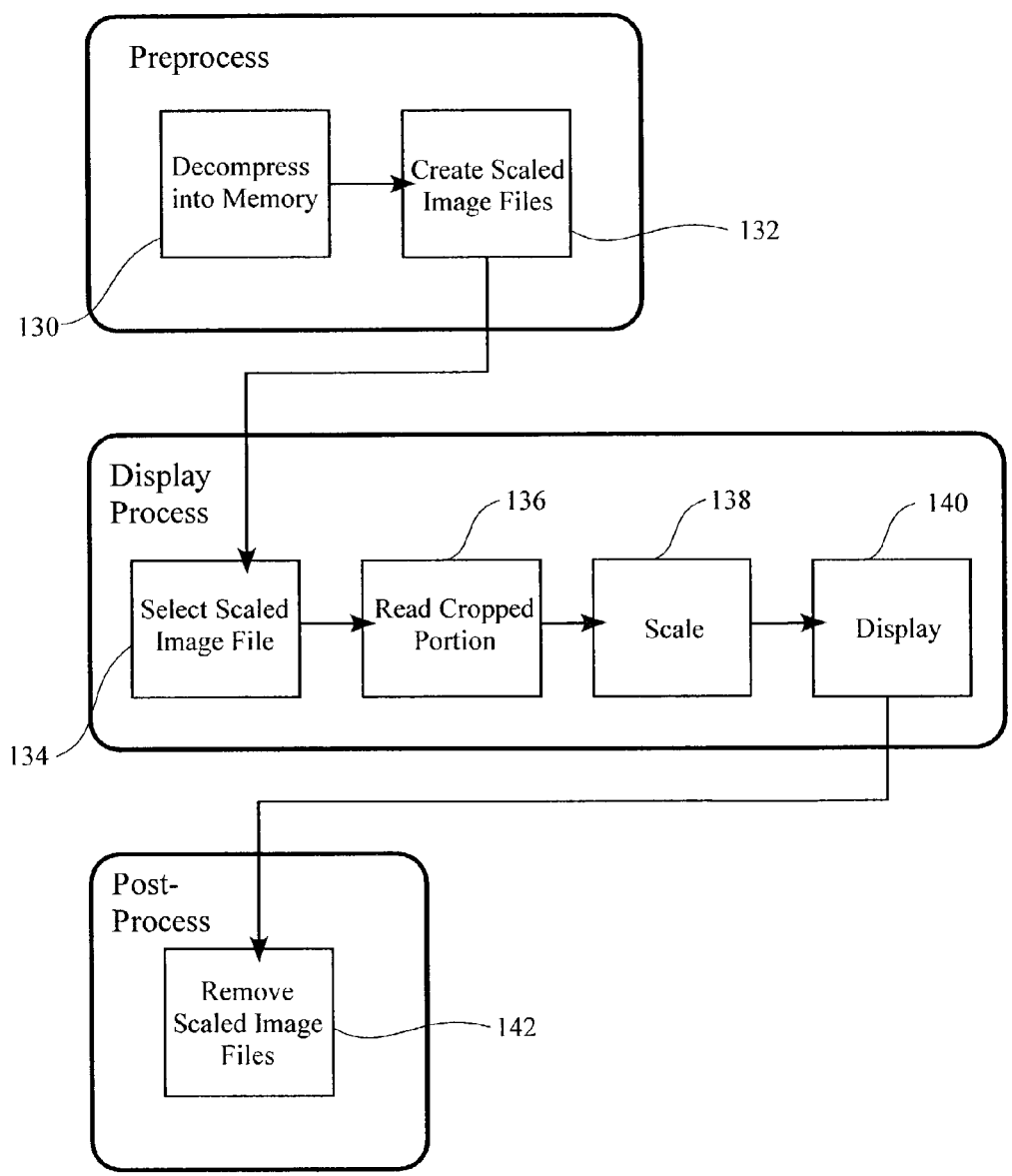
FIG. 3 is a flowchart diagram of the method operations for reducing the memory requirements when presenting a large high resolution image in accordance with one embodiment of the invention.

FIG. 3 is a flowchart diagram of the method operations for reducing the memory requirements when presenting a large high resolution image in accordance with one embodiment of the invention. The method initiates with operation 130 where the image is decompressed into memory, such as the memory of a personal computer. Here the image, such as a Joint Photographic Experts Group (JPEG) image, is decompressed into the memory. It should be appreciated that while JPEG images are used as an exemplary compressed format, any compressed format, such as Graphic Interchange Format (GIF), can be used with the embodiment described herein. Once the decompressed image is stored into memory, the method proceeds to operation 132 where scaled image files are created and stored on a storage media, such as a hard drive associated with the personal computer. Here, multiple copies, each having differing magnifications, of the image data in memory is stored on the storage media. In one embodiment, each of the multiple copies has a magnification which is less than or equal the original full scale image data stored that is decompressed into memory in operation 130, as will be explained in more detail below.

Operation 130 and 132 make up the preprocessing steps of the method of FIG. 3. It should be appreciated that in one embodiment, the entire image is not read or decompressed into memory in operation 130. That is, only enough of the image will be read or decompressed into memory to generate a portion of the scaled image files. In another embodiment, the scaled image files are generated in parallel in operation 132. That is, each scaled file is built simultaneously.

The method of FIG. 3 then moves to operation 134 where a scaled image file is selected. It should be appreciated that included in selecting the scaled image is determining a magnification size, i.e., display scale, for an image being presented on a display screen, such as a computer monitor. In one embodiment, the selected scaled image is the image file with the closest magnification that is equal to or greater than the magnification size associated with the display screen. The method then advances to operation 136 where a selected image file is cropped and read into memory. It will be apparent to one skilled in the art that where the image is being initially displayed, operation 136 may not be performed as the image has not been presented to be cropped. However, under certain instances it is possible that operation 136 is performed on the initial display of the image. For example, upon exit an application can save the state of the image it is currently displaying. Upon restarting, the application loads the state of the previous image that was being displayed. This image may have been cropped. Accordingly, to restore the state of the image, a crop is performed on the initial display of the image. Where a crop is not performed, the method would move from operation 134 to operation 138. If the selected scaled image file is not equal to the magnification size, i.e., it is greater, a small scale of the cropped portion is performed in operation 138. It should be appreciated that where the magnification of the selected scaled image is equal to the magnification size, it is not necessary to perform the scaling in operation 138. In one embodiment, if the magnification size is greater than 100%, then the 100% image is used for display. The method then advances to operation 140 where the selected image is displayed.

Operations 134, 136, 138 and 140 of FIG. 3 are included in the display process. One skilled in the art will appreciate that upon the initial display of an image, that operation 136, may not performed as a user has not yet been presented the image. In one embodiment, an application may save the state of the image it is currently displaying. When the application is restarted it loads the state of the previous image that was being displayed, which might have been cropped. In order to restore the state of the image, a crop might be performed on the initial display of the image in this embodiment. Additionally, once the user is presented the image, the user can select a portion of the image to be displayed on the full screen. For example, where the image is a picture of a person, the user may want a close-up of the person's face displayed. Here, a cropped portion of the image will be read from the selected scaled image. Following the display of the selected image in operation 140, the method advances to operation 142 where the scaled image files are removed. Here, the various size scaled images are deleted and the memory used for the image to be displayed is released. It will be apparent to one skilled in the art that by creating several scaled images at one time and storing them on the hard disk, avoids the large delay when the magnification of an image is changed in the prior art method. It should be appreciated that the display process can be iterated multiple times as a user changes magnification and pans around the image. Once the user is finished viewing the image, which may encompass multiple iterations of the display process, then the post processing step is performed.

Figure 4:
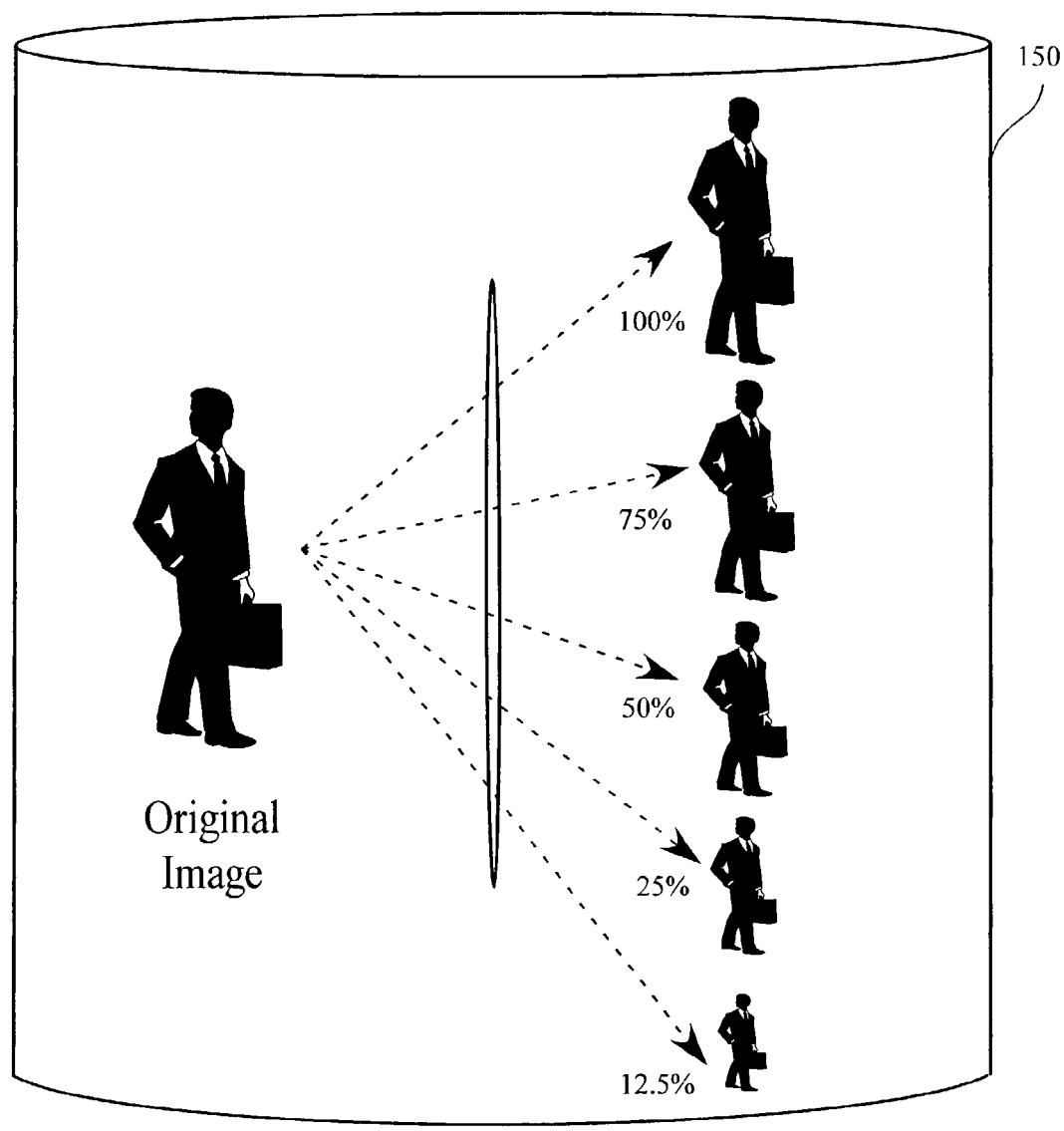
FIG. 4 is a simplified schematic diagram of various scale images stored on a storage medium in accordance with one embodiment of the invention.

FIG. 4 is a simplified schematic diagram of various scale images stored on a storage medium in accordance with one embodiment of the invention. During the preprocessing operation with reference FIG. 3, 100%, 75%, 50%, 25%, and 12.5% scaled versions of the image can be stored on disk 150. Accordingly, any time a region of the image is displayed at one of these magnifications, that file can be used to display the image and no scaling will be necessary. If the region needs to be scaled by a magnification that is not stored on disk, the closest file that has a larger magnification is selected for display. For example, for 20% magnification, the 25% magnification image file would be selected. Since the 25% image file is larger than the display scale for the display screen used to present the image, a small quick scale would have to be performed to display the image at the 20% magnification. This method cuts down considerably the amount of the image that needs to be handled in memory by minimizing the scaling operations.

Using the above mentioned example case, to read the 25 MB JPEG compressed image file took about 35–40 seconds as opposed to a method where pre-scaled images are not performed which took about 2 minutes. The examples were performed using a 333 megahertz personal computer with 256 megabytes of memory. Even though the pre-scaling approach defined above requires more preprocessing to generate the scaled files, it reduces the amount of virtual memory swapping. Repainting an image, due to magnification changes or panning the image, is not noticeably slower, at magnifications that are about the same as the generated scaled image files. When the magnification is different, there is a slight delay when panning the image, however, the delay is considerably shorter than the delay associated with the prior art approach. The disk space for this method is relatively large. For the test image discussed above (25 MB JPEG), if 100%, 75%, 50%, 25% and 12.5% scaled images are stored on the disk, about 271 MB of disk space is used. If the size of the original image is also included then about 297 MB of disk space is used. As will be discussed below in reference to FIG. 7, enhancements to the above described approach will significantly reduce the amount of disk space used. The amount of memory used here is approximately the size of the display window.

Figure 5:
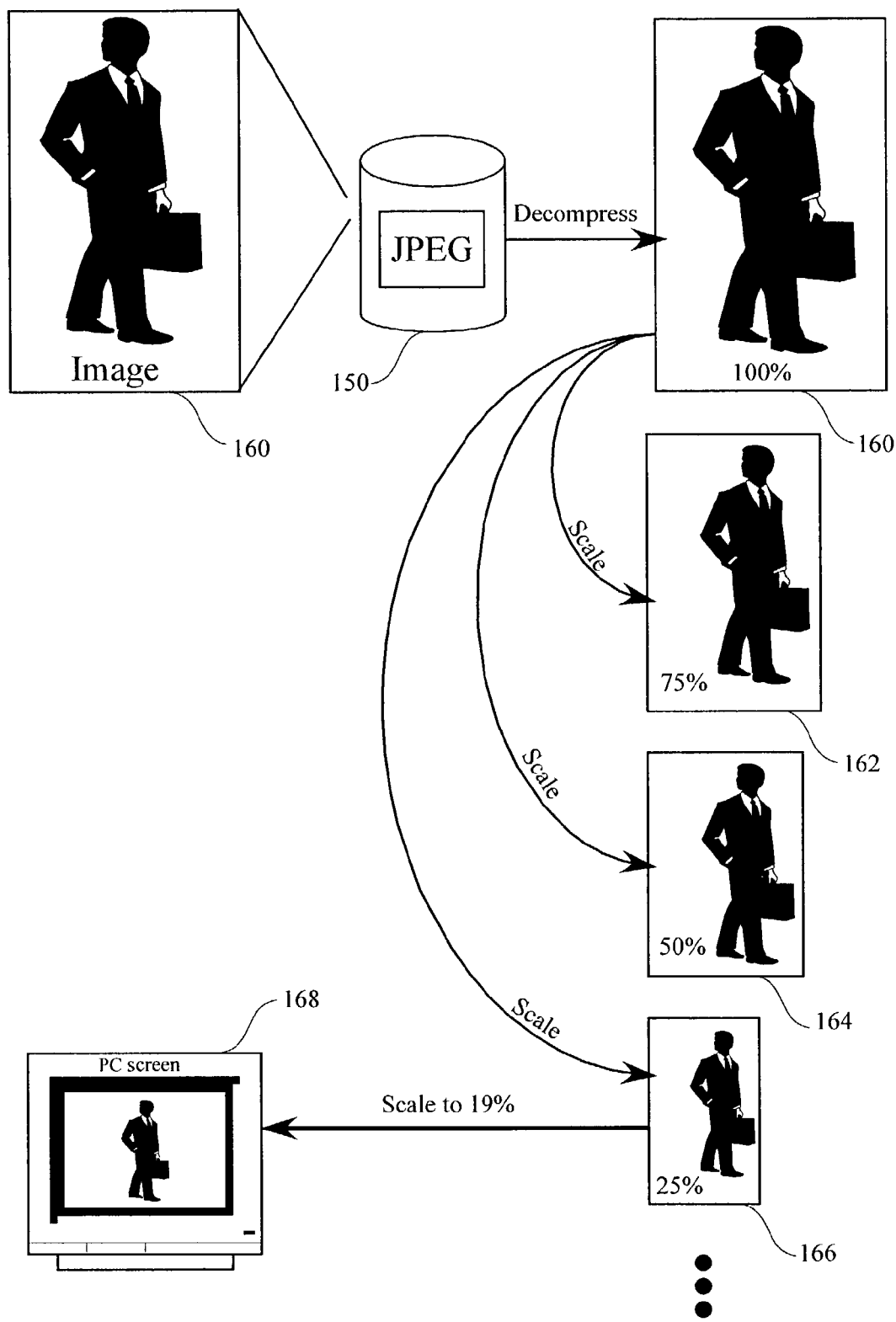
FIG. 5 is a simplified schematic diagram of the pre-scaling approach generating various scale images from an initial image in accordance with one embodiment of the invention.

FIG. 5 is a simplified schematic diagram of the pre-scaling approach generating various scale images from an initial image in accordance with one embodiment of the invention. Initial image 160 can be an image from a digital camera or even a number of images from a digital camera stitched together. Image 160 is stored in compressed format, such as a JPEG format, on hard disk 150. Hard disk 150 is associated with a personal computer having a display monitor in one embodiment of the invention. As mentioned above with reference to FIG. 3, the initial image 160 is decompressed into memory and a copy of the full size, i.e., 100%, image is saved onto disk 150. From the decompressed image 160 in memory, scaled images, 162, 164, and 166 are created and stored on disk 150. Here, scaled versions of image 160 include 75% scaled image 162, 50% scaled image 164 and 25% scaled image 166. It should be appreciated that any size scaled image less than the 100% scaled image can be used here, as the scale sizes used herein are for illustrative purposes only and not meant to be restrictive.

Continuing with FIG. 5, the personal computer associated with storage disk 150, has a display monitor 168. Display monitor 168 is configured such that a display scale of 19% of original image 160 corresponds to a full screen view on the display monitor. Accordingly, pre-scaled image 166 having a 25% scale is selected since the 25% scale version is the closest in scale size without being less than the display scale of display monitor 168. 25% scale version 166 is then scaled down to 19% to be displayed on monitor 168. In this case a small quick scale is performed to display the image at the 19% magnification on display monitor 168. One skilled in the art will appreciate that having the pre-scaled versions of the image at various magnifications cuts down considerably the amount of the image that needs to be handled in memory.

Figure 6:
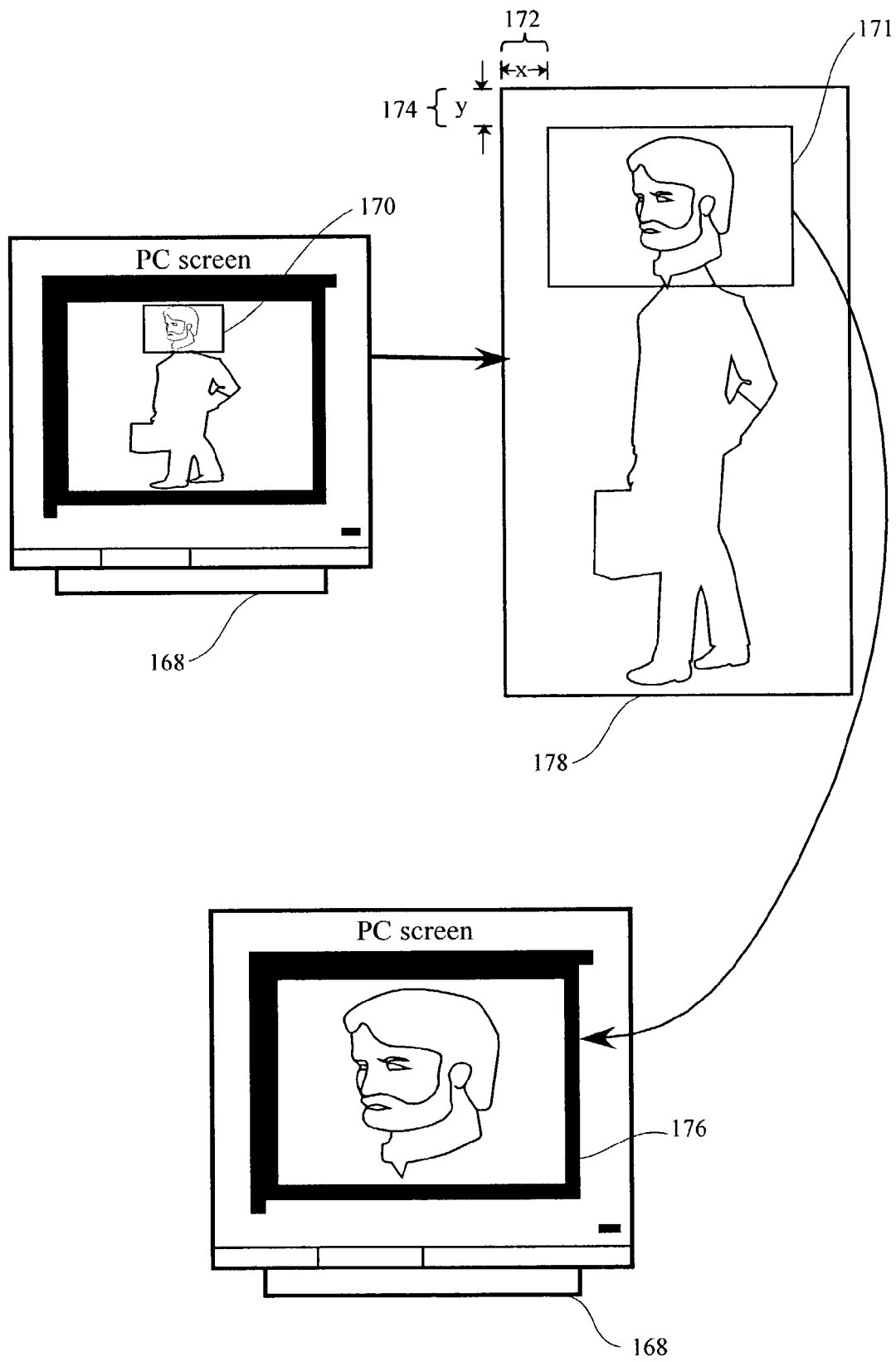
FIG. 6 is a simplified schematic diagram of a displayed image being manipulated in accordance with one embodiment of the invention.

FIG. 6 is a simplified schematic diagram of a displayed image being manipulated in accordance with one embodiment of the invention. A user that is presented an image, such as the image depicted on display screen 168 of FIG. 5, may want to edit or manipulate the image. For example, a user may want to see a close-up of a person's face. Referring back to FIG. 6, the user selects region 170 of the image displayed on display monitor 168 to be magnified. Since the various scaled versions of the image are still stored on disk 150 of FIGS. 4 and 5, the magnification scale closest to a scale size for selected region 170, when region 170 is displayed on display monitor 168, is selected. As mentioned above, if an exact scale size is not available, the next larger scale size in storage is selected. One skilled in the art will appreciate that the location of cropped region 171 of selected scale size 178 can be determined by the offset of region 170. That is, the offset of region 170 can be translated to x coordinate 172 and y coordinate 174 of selected scale size 178 because the magnification of the selected scale size is known as is the offset of region 170.

Referring back to FIG. 5, 25% scale size 166 was used as a base image for the eventual display image. However, when the user selects region 170 of FIG. 6, 75% scale size 162 of FIG. 5 is closest in magnification. Cropped region 171 corresponding to region 170 of 75% scale size 162 is located and the cropped region is read into memory. Referring back to FIG. 6, where cropped region 171 is larger than a display scale of monitor 168, cropped region 171 is scaled and displayed as region 176 on monitor 168. For example, region 171 can be scaled to 70% scale size in order to fit on display monitor 168. It will be apparent to one skilled in the art that the method used to manipulate a displayed image is similar to the display process method operations with reference to FIG. 3. Furthermore, the method applies to any scale size and is not limited to the exemplary scale sizes discussed above.

Figure 7:
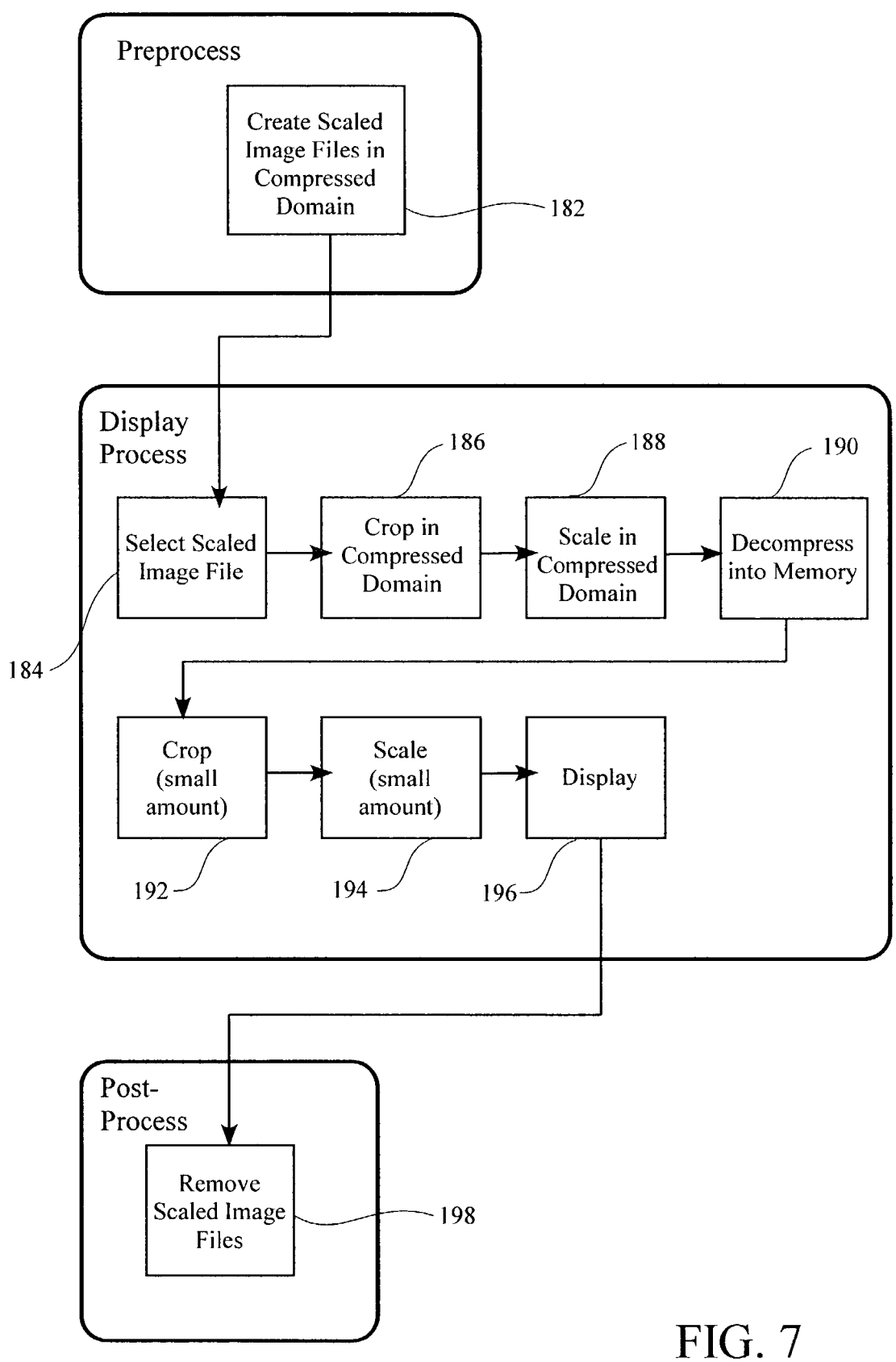
FIG. 7 is a flowchart diagram of the method operations for reducing the memory requirements and disk space requirements when presenting a large, high resolution image in accordance with one embodiment of the invention.

FIG. 7 is a flowchart diagram of the method operations for reducing the memory requirements and disk space requirements when presenting a large, high resolution image in accordance with one embodiment of the invention. As mentioned above, the method described with reference to FIG. 3 provides increased performance in terms of processing large images, however, the pre-scaled versions of the image take-up a large portion of disk space. In order to alleviate any concern about running out of disk space, especially if two or more images are viewed at the same time, the pre-scaled images can be stored on disk in a compressed format. The flowchart of FIG. 7 initiates with operation 182 where scaled image files are created in the compressed domain. Accordingly, multiple pre-scaled image files in compressed format are created from the compressed file in memory. The method then moves to operation 184 where a scaled image file in the compressed format is selected. It should be appreciated that included in selecting the scaled image is determining a magnification size, i.e., display scale, for an image being presented on a display screen, such as a computer monitor. In one embodiment, the selected scaled image is the image file with the closest magnification that is equal to or greater than the magnification size associated with the display screen.

Still referring to FIG. 7, the method advances to operation 186 where the selected image is cropped in the compressed domain if a portion of the image has been chosen to be displayed. It should be appreciated that operation 186 is not performed for the initial viewing of the image as a user has not yet been presented the image. Thus, for the initial viewing of an image, the method proceeds from operation 184 to operation 188 where the selected image is scaled in the compressed domain. By using compressed domain processing to perform the initial scale, and if necessary the initial crop, memory requirements are kept to a minimum. The method then moves to operation 190 where the selected image file that has been processed in the compressed domain is decompressed into memory. One skilled in the art will appreciate that where the image file is scaled and cropped in the compressed domain, a small amount of cropping and scaling may be necessary after the file is decompressed. For example, with JPEG files, which are stored as 8×8 discrete cosine transform (DCT) blocks, the processing in the compressed domain may not be able to obtain the level of definition capable in the decompressed domain as will be explained with reference to FIG. 9. Additionally, as discussed above with reference to operation 138 of FIG. 3, a scaling operation may be performed on the image in the decompressed domain where the multiple pre-scaled images do not exactly define a display scale required by a display monitor on which the selected image is to be displayed.

Continuing with FIG. 7, the method proceeds to operation 192 where the image is cropped, if necessary. Where the cropping is not necessary, the method proceeds from operation 190 to operation 194 where any scaling is performed to scale the image to the display scale. Similar to the discussion, with reference to FIG. 3, where the next largest scale file is the selected file, because the display scale for the display monitor on which the image will be displayed is not available, the selected file is scaled down to the display scale. That is, if a 25% scale file is the next closest available scale size for a display monitor requiring a 20% scale size, the 25% scale size, which is the selected file, is scaled down to 20%. The method then advances to operation 196 where the processed image is displayed on a suitable display monitor. The method then moves to operation 198 where the generated pre-scaled image files are removed and the memory used in the display processing is released.

As mentioned with reference to FIG. 3, the method operations of FIG. 7 can be subdivided into three broad processing categories. Method operation 182 is included in the preprocessing step. Preprocessing includes creating multiple pre-scaled images in a compressed format. Display processing operations, such as cropping and scaling, occur in both the compressed domain and the decompressed domain. Method operations 184–196 are included in the display processing category. Post processing includes operation 198 which restores the system to an equivalent state prior to the preprocessing operations being performed.

Figure 8:
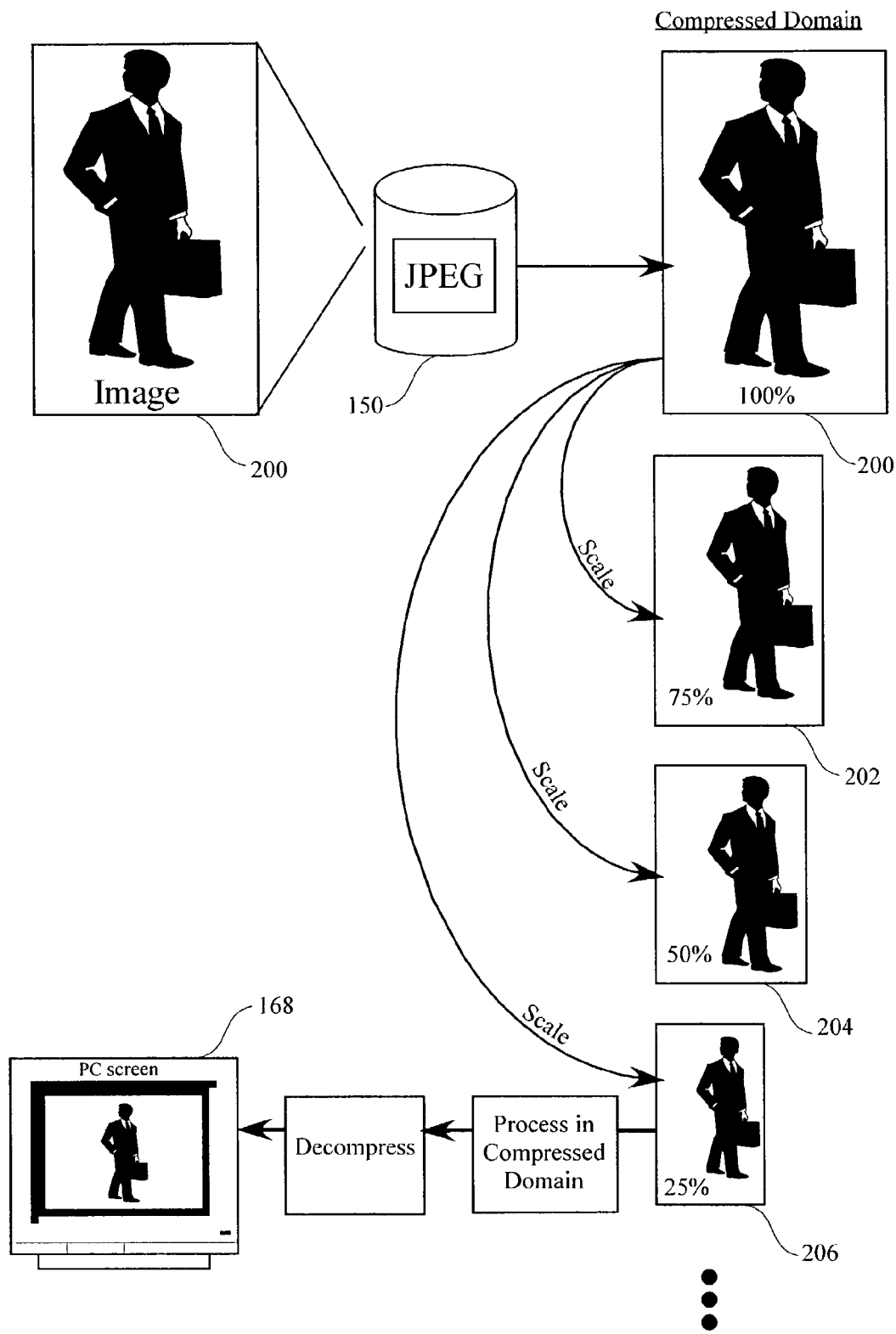
FIG. 8 is a simplified schematic diagram of the pre-scaling approach generating various scale images from an initial image in the compressed domain in accordance with one embodiment of the invention.

FIG. 8 is a simplified schematic diagram of the pre-scaling approach generating various scale images from an initial image in the compressed domain in accordance with one embodiment of the invention. Initial image 200 can be an image from a digital camera or even a number of images from a digital camera stitched together. Image 200 is stored in compressed format, such as a JPEG format, on hard disk 150. Hard disk 150 is associated with a personal computer having a display monitor in one embodiment of the invention. Initial image 200 is copied into memory and a copy of the initial image is saved onto disk 150 in a compressed format. From compressed image 200 in memory, scaled images, 202, 204, and 206 are stored on disk 150 in a compressed domain. Here scaled versions of image 200 include 75% scaled image 202, 50% scaled image 204 and 25% scaled image 206. It should be appreciated that any size scaled image less than the 100% scaled image can be used here, as the scale sizes used herein are for illustrative purposes only and not meant to be restrictive.

Continuing with FIG. 8, the personal computer associated with storage disk 150, has a display monitor 168. Display monitor 168 is configured such that a display scale of 15% of original image 200 corresponds to a full screen view on the display monitor. Accordingly, pre-scaled image 206 having a 25% scale is selected since the 25% scale version is the closest in scale size without being less than the display scale of display monitor 168. 25% scale version 206 is then scaled down to 15%, if this scale is capable of being attained in the compressed domain. If the 15% scale can not be obtained in the compressed domain, then the scale is brought down as close as possible in the compressed domain, the file is decompressed and a small, quick scale is performed to display the image at the 15% magnification on display monitor 168. For example, a JPEG file may only be able to be takes from 25% scale to 16% scale due to the 8×8 block configuration used by JPEG files. Therefore, the scaling operation to reduce the magnification from 16% to 15% is performed in the decompressed domain. One skilled in the art will appreciate that having the pre-scaled versions of the image at various magnifications cuts down considerably the amount of the image that needs to be handled in memory. As illustrated in Table 1 below, the amount of disk space used is significantly reduced through the compressed domain processing. Furthermore, the memory used remains small due to the pre-scaling process.

TABLE 1

| METHOD | MEMORY USED (MB) | DISK SPACED USED (MB) |
| --- | --- | --- |
| Pre-scaling | Display area | 271 |
| Compressed domain | Slightly larger than display area | 20 |

Figure 9:
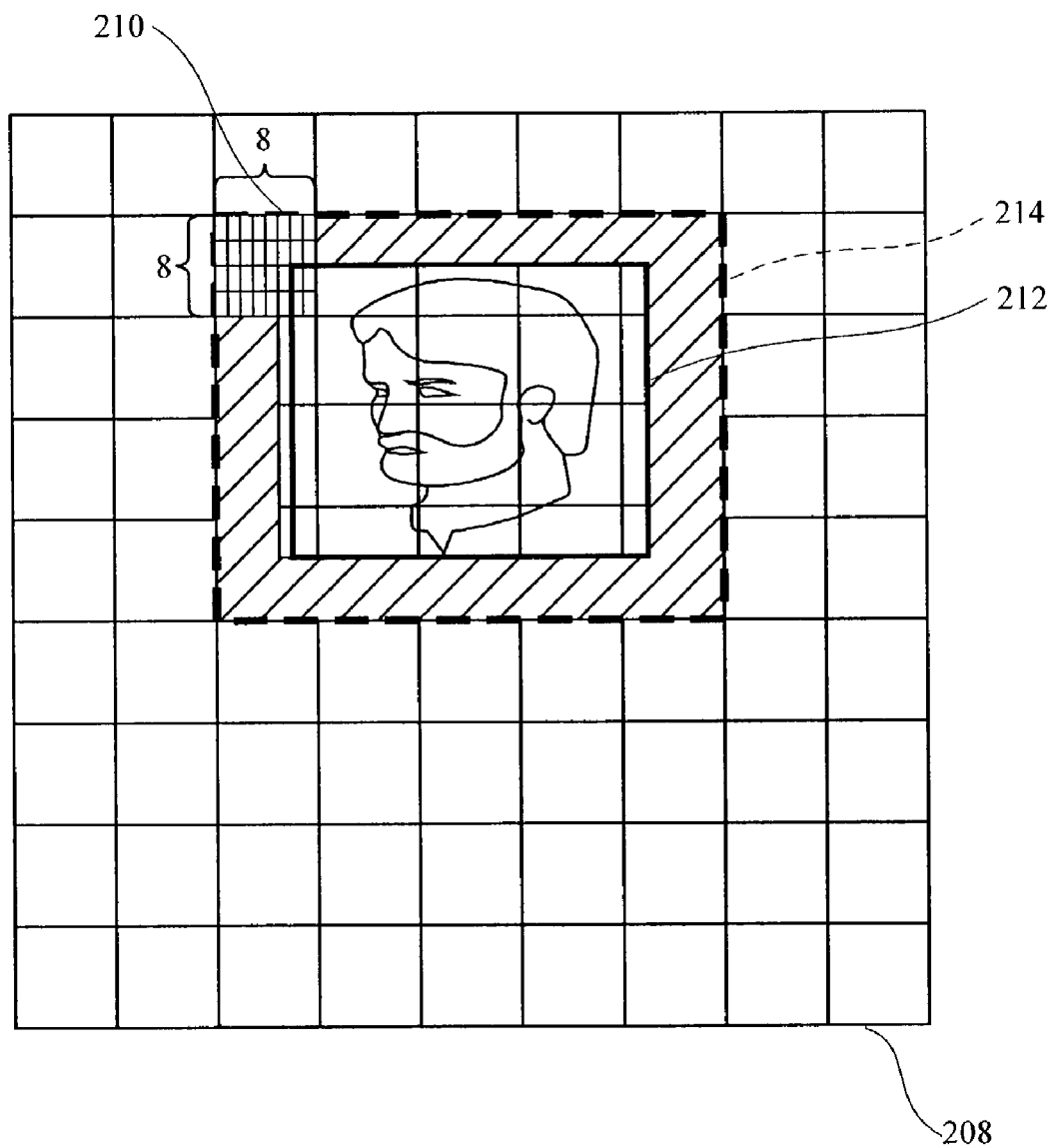
FIG. 9 is a schematic diagram of a decompressed file that is illustrative of the approach for cropping a file using compressed domain processing followed by decompressed domain processing in accordance with one embodiment of the invention.

FIG. 9 is a schematic diagram of a decompressed file that is illustrative of the approach for cropping a file using compressed domain processing followed by decompressed domain processing in accordance with one embodiment of the invention. For example, a user that is presented an image may decide to manipulate or edit the image. As discussed with reference to FIG. 6, the user can decide to zoom in on a person's face. Entropy decoding JPEG file 208 produces a plurality of 8×8 DCT blocks, such as block 210. As is known in the art, JPEG encodes using 8×8 blocks. Thus, when a user selects to crop an image being displayed, the cropping in the compressed domain may not be able to provide the exact size selected by the user. For example, the region selected by the user is contained within outline 212. However, when JPEG file 208 is in compressed format, the region defined within outline 212 can not be accessed as it is contained within the 8×8 blocks. Thus, the cropping operation in the compressed domain crops JPEG file 208 to the region defined within outline 214, i.e., on the closest 8×8 block boundaries. The region within outline 214 is the closest crop to the user selected region obtainable in the compressed domain without being smaller than the user selected region defined by outline 212. It should be appreciated that the compressed domain cropped region defined within outline 214 is decompressed and then the region between outline 214 and 212 is cropped further in the decompressed domain. Accordingly, regions of an image with arbitrary magnification are quickly displayed by storing various predetermined magnifications of the original image on a hard disk. To conserve memory and disk space, the image files are stored in a compressed format and manipulated in the compressed domain. This allows for limited memory PC's to display the images in a quick manner suitable to be used in applications where users can easily change the magnification and the region of interest to be displayed.

Figure 10:
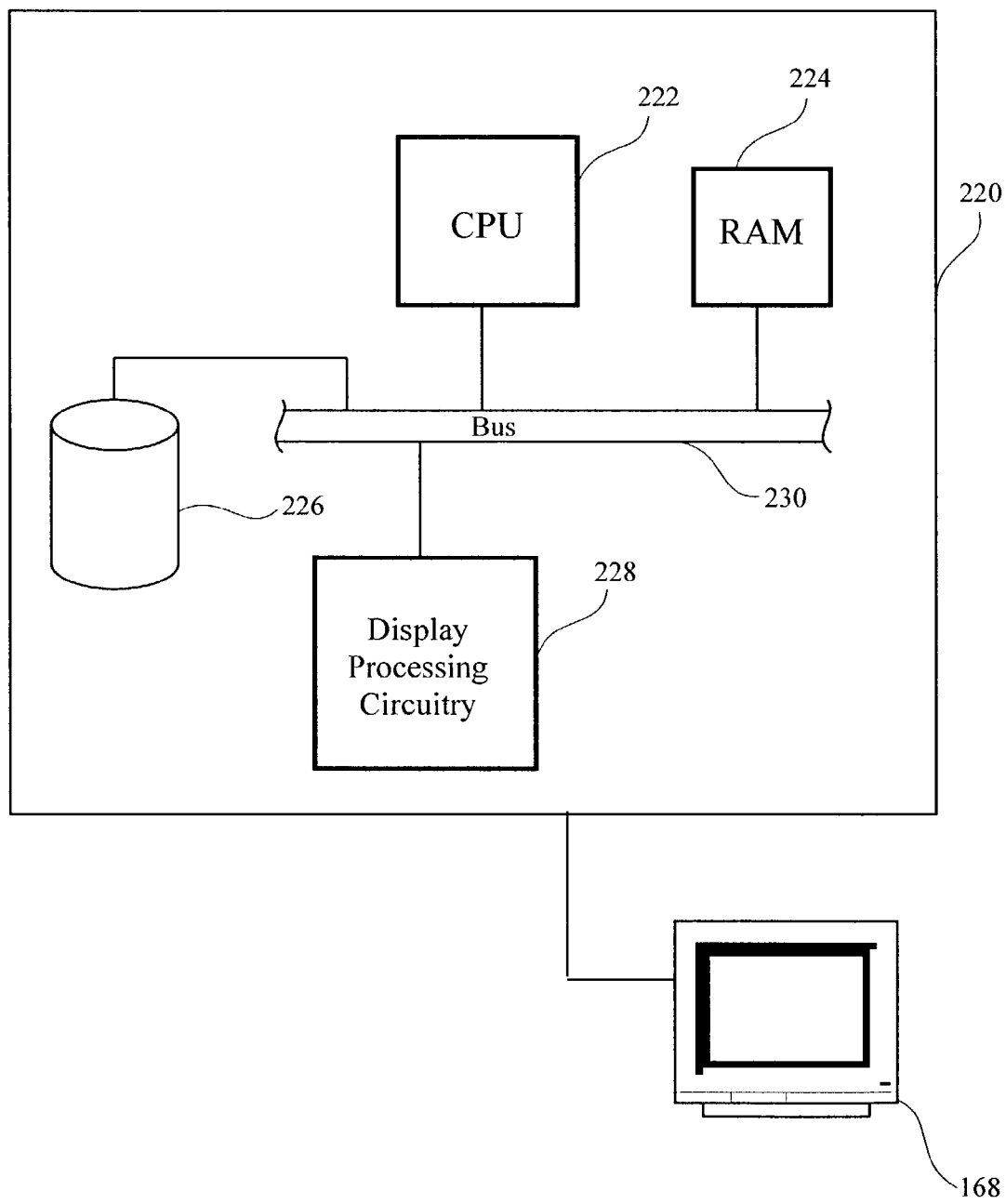
FIG. 10 is a simplified schematic of a computer system having display processing circuitry enabling efficient processing of image data in accordance with one embodiment of the invention.

FIG. 10 is a simplified schematic of a computer system having display processing circuitry enabling efficient processing of image data in accordance with one embodiment of the invention. Computer system 220 includes central processing unit (CPU) 222, hard drive 226, and random access memory (RAM) 224 in communication with bus 230. Display processing circuitry 228 is also in communication with bus 230. One skilled in the art will appreciate that display processing circuitry includes logic gates configured to provide the functionality discussed with reference to FIGS. 3–9 above. For example, a hardware description language (HDL) can be employed to synthesize the display processing circuitry and the layout of the logic gates for providing the necessary functionality described herein.

In summary, the above described invention reduces memory usage through the pre-scaling of different magnifications of an image, while the disk space required is minimized by operating in the compressed domain. It should be appreciated that since the primary manipulations are performed in the compressed domain, the amount of image data being handled by the display system is further reduced. The method operation described herein include a cropping operation followed by a scaling operation. However, the order can be switched where a scaling operation is followed by a cropping operation. One skilled in the art will appreciate that performing the cropping operation and then the scaling operation will result in less image data having to be handled in the scaling operation.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for efficiently processing image data for display on a computer monitor, comprising:
    reading image data in a compressed format into a memory associated with the computer;
    generating at least one scaled copy of the image data in the compressed format
    determining a display scale of an image to be presented on a computer monitor;
    if the display scale of the image to be presented on the computer monitor is less than 100% of an image scale associated with the image data, the method includes,
    determining which one of the image data and the at least one scaled copy of the image data is closest in magnification to the display scale, without being less than the display scale, to provide a closest in magnification image data;
    processing the closest in magnification image data in the compressed format; and
    displaying the processed image data.

2. The method of claim 1, wherein the compressed format is selected from the group of Joint Photographic Experts Group (JPEG) and Graphic Interchange Format (GIF).

3. The method of claim 1, wherein the method operation of processing the closest in magnification image data in the compressed format, includes:
    cropping the image data in the compressed format; and
    scaling the image data in the compressed format.

4. The method of claim 1, wherein the method operation of generating at least one scaled copy of the image data in the compressed format, further includes:
    storing each of the at least one scaled copy of the image data on a storage media associated with a computer system that includes the computer monitor.

5. The method of claim 4, wherein the storage media is a hard drive.

6. The method of claim 1, wherein upon completion of displaying the processed image, the method further including:
    removing the at least one scaled copy of the image data; and
    releasing the memory used during processing the image data.

7. The method of claim 1, wherein each of the at least one scaled copy of the image data has a scale size that is less than a scale size of the image data.

8. The method of claim 1, wherein if the display scale is greater than or equal to 100% of the image scale associated with the image data, the image data is the closest in magnification image data.

9. A method for efficiently editing an image on a computer display, the image on the computer associated with a plurality of stored images, each of the plurality of stored images having a different scale size, comprising:
    selecting a portion of an image;
    determining an offset of the selected portion of the image;
    identifying a closest in magnification image from the plurality of stored images, the closest in magnification image having a scale size greater than or equal to a scale size of the selected portion of the image;
    identifying image data of the closest in magnification image corresponding to the selected portion of the image; and
    displaying the identified image data.

10. The method of claim 9, wherein the method operation of identifying image data of the closest in magnification image corresponding to the selected portion of the image, includes:
    translating the offset of the selected portion of the image to determine a region of the closest in magnification image corresponding to the selected portion.

11. The method of claim 9, wherein the offset defines coordinates of a starting point of the selected portion.

12. The method of claim 9, wherein the method operation of identifying image data of the closest in magnification image corresponding to the selected portion of the image, includes:
    processing the identified image data in the compressed domain.

13. The method of claim 12, wherein the method operation of processing the identified image data in the compressed domain, includes:
    cropping the image data in the compressed format; and
    scaling the image data in the compressed format.

14. The method of claim 9, wherein upon completing the displaying of the image data, the method further includes;
    removing each of the plurality of stored images.

15. A method for reducing memory usage to display an image on a computer display, comprising:
    accessing image data stored in a compressed format;
    decompressing the image data into a full scale image stored in a memory associated with a computer;
    generating at least one pre-scaled image of the full scale image, the at least one pre-scaled image having a magnification less than the full scale image;
    determining a display scale of the image for presentation on a computer display;

selecting one of the full scale image and the at least one pre-scaled image that is closest in magnification to the display scale without being less than the display scale;

processing the selected image; and displaying the processed image.

16. The method of claim 15, wherein the method operation of processing the selected image, includes:

cropping the selected image; and scaling the selected image to the display scale.

17. The method of claim 15, wherein the method operation of generating at least one pre-scaled image of the full scale image, includes:

storing the at least one pre-scaled image and the full scale image on a storage media associated with a computer system including the computer display.

18. The method of claim 15, wherein upon completion of displaying the processed image, the method further including:

removing the at least one scaled copy of the image data; and releasing the memory used during processing the image data.

19. A computer readable media having program instructions for efficiently processing data for display on a computer monitor, comprising:

program instructions for reading image data in a compressed format into a memory associated with the computer;

program instructions for generating at least one scaled copy of the image data in the compressed format;

program instructions for determining a display scale of an image to be presented on a computer monitor;

program instructions for determining which one of the image data and the at least one scaled copy of the image data is closest in magnification to the display scale without being less than the display scale to provide a closest in magnification image data;

program instructions for processing the closest in magnification image data in the compressed format; and program instructions for displaying the processed image.

20. The computer readable media of claim 19, wherein the compressed format is selected from the group of Joint Photographic Experts Group (JPEG) and Graphic Interchange Format (GIF).

21. The computer readable media of claim 19, wherein the program instructions for processing the closest in magnification image data in the compressed format, includes:

program instructions for cropping the image data in the compressed format; and program instructions for scaling the image data in the compressed format.

22. The computer readable media of claim 19, wherein the program instructions for generating at least one scaled copy of the image data in the compressed format, further includes:

program instructions for storing each of the at least one scaled copy of the image data on a storage media associated with a computer system that includes the computer monitor.

23. The computer readable media of claim 22, wherein the storage media is a hard drive.

24. A computer system for displaying images using compressed domain processing, comprising:

a storage media storing an image data file in a compressed format;

a memory;

a monitor for displaying image data, the monitor being associated with a display scale for presenting images;

a central processing unit (CPU) configured to process instructions directing the stored image data to the memory; and display processing circuitry configured to generate at least one scaled image file in a compressed format from a stored image file in the compressed format, the display processing circuitry being capable of identifying one of the stored image file and the at least one scaled image file that is closest in magnification to the display scale without being less than the display scale, wherein the display processing circuitry is configured to enable cropping and scaling the identified image file in the compressed format.

25. The computer system of claim 24, wherein the at least one scaled image file is stored on the storage media.

26. The computer system of claim 25, wherein the display processing circuitry is configured to remove the at least one scaled image file from the storage media upon completion of displaying an image associated with one of the stored image file and the at least one scaled image file.

27. The computer system of claim 24, wherein the storage media is a hard drive.

28. An integrated circuit chip configured to efficiently process image data in a compressed format for display on a computer monitor, comprising:

means for generating at least one scaled image file in a compressed format from a stored image file in the compressed format;

means for identifying one of the stored image file and the at least one scaled image file that is closest in magnification to a display scale of a computer monitor without being less than the display scale; and means for cropping and scaling the identified image file in the compressed format.

29. The integrated circuit chip of claim 28, wherein the at least one scaled image file has a scale size that is less than a scale size of the stored image file.

* * * * *